Jan. 12, 1932.        H. A. DENMIRE        1,840,569
                      WATCHCASE HEATER
              Filed Oct. 4, 1926        4 Sheets-Sheet 1
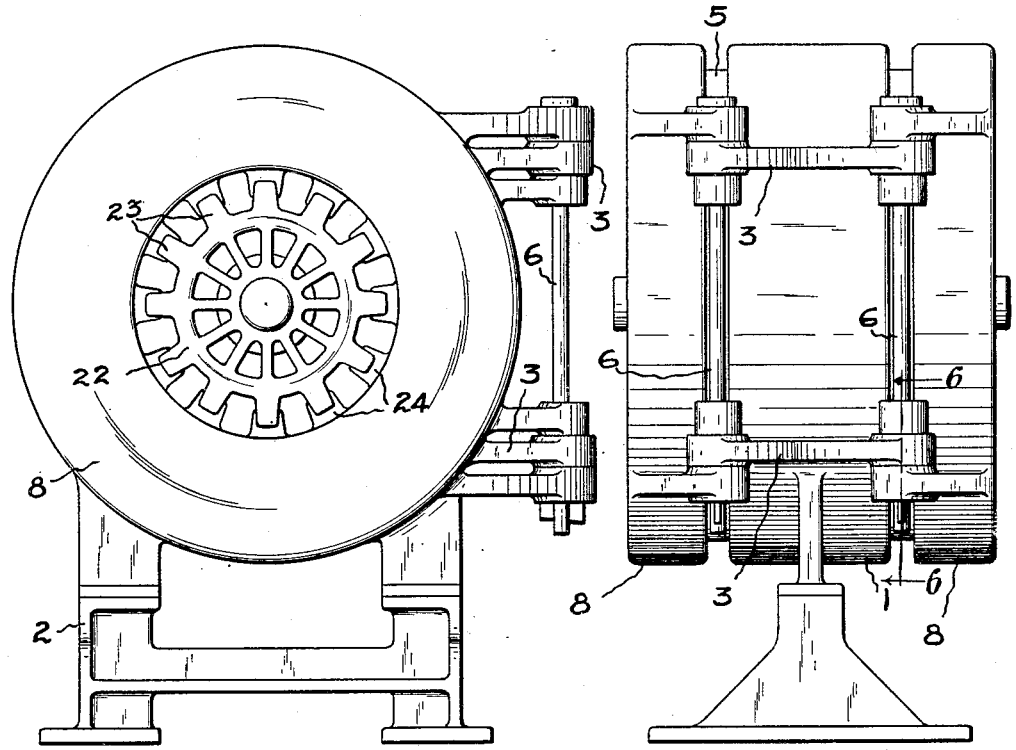
Fig.1.                                    Fig.2.
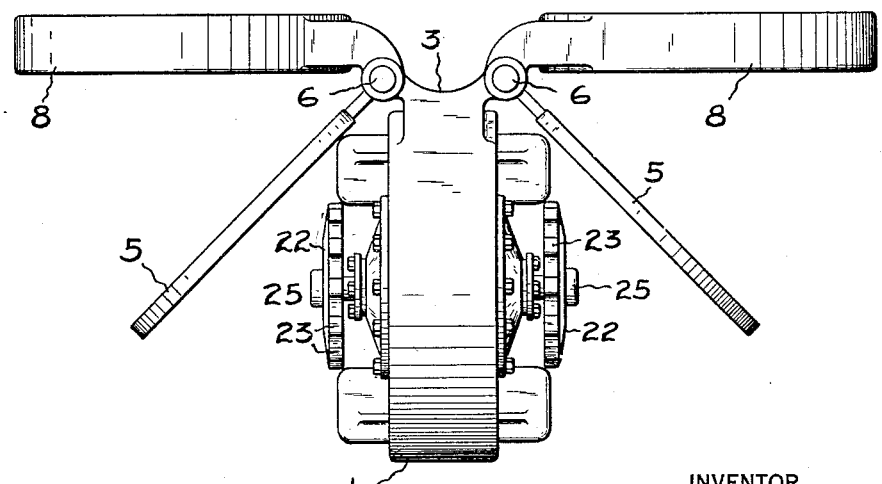
Fig.3.
INVENTOR
Harold A. Denmire
BY Evans & McCoy
ATTORNEYS

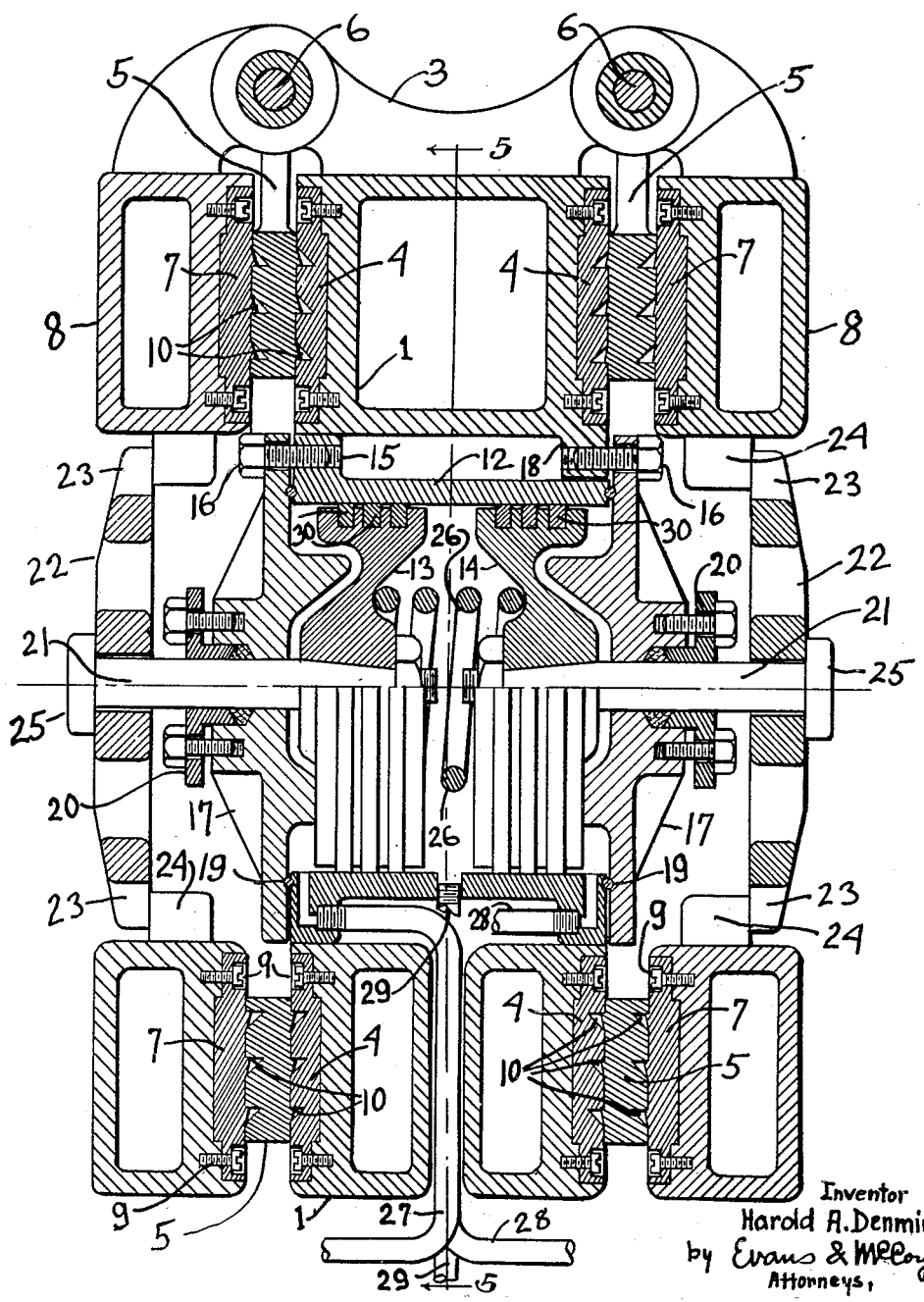

Inventor
Harold A. Denmire
by Evans & McCoy
Attorneys

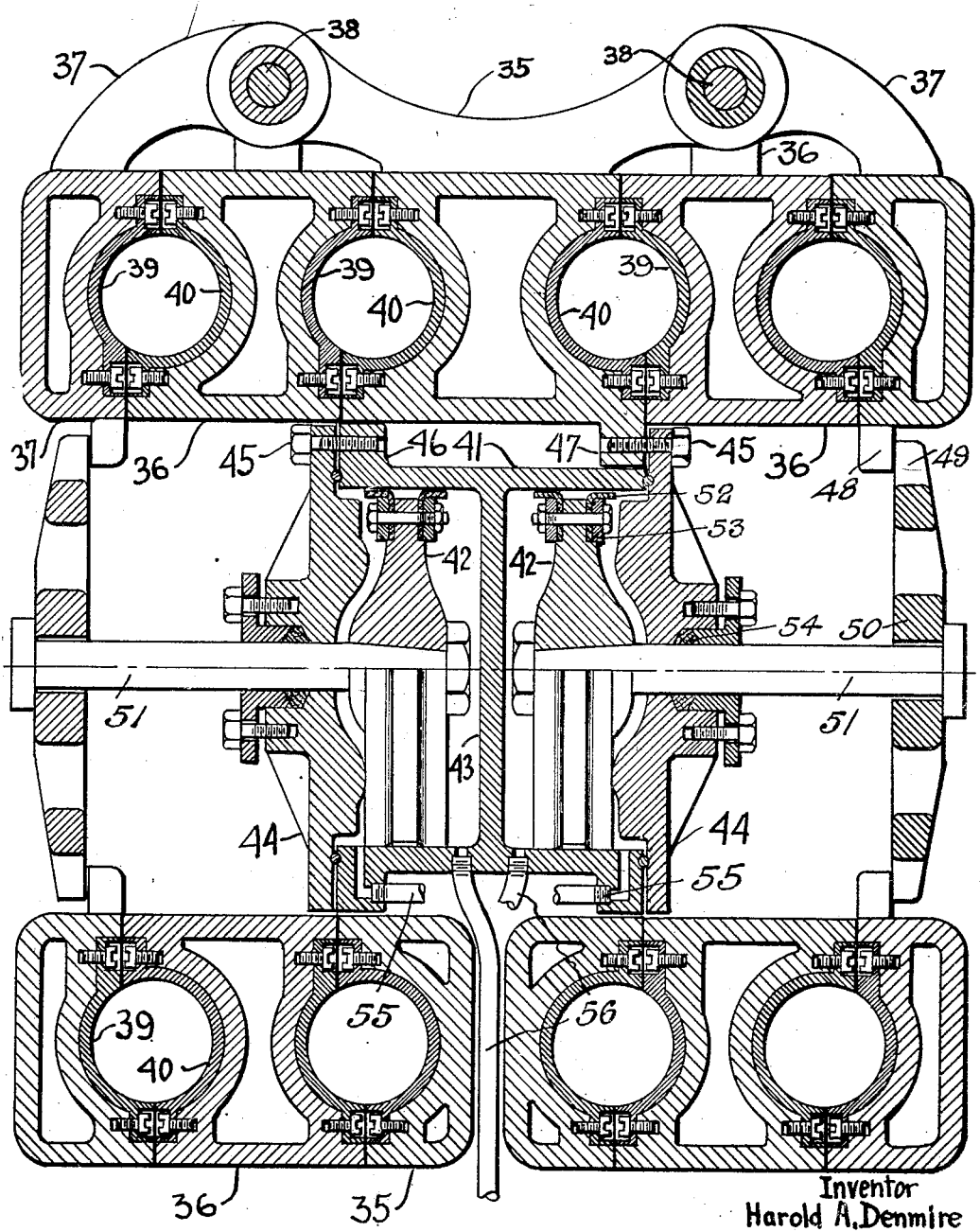

Patented Jan. 12, 1932

1,840,569

UNITED STATES PATENT OFFICE

HAROLD A. DENMIRE, OF AKRON, OHIO, ASSIGNOR TO THE GENERAL TIRE & RUBBER COMPANY, OF AKRON, OHIO, A CORPORATION OF OHIO

WATCHCASE HEATER

Application filed October 4, 1926. Serial No. 139,485.

This invention relates to molds for forming articles that are adapted to be subjected to heat and pressure and it particularly refers to molds suitable for use in curing or forming annular articles of the character indicated.

One of the objects of the invention is to provide a watch case mold structure for receiving annular objects to be molded therein that is capable of exerting intense pressure on the article while subjecting the article to heat for a predetermined period of time.

Another object of the invention is to provide a mold of the character specified that is hydraulically operated by directly applied pressure and in which the movement of the pressure imposing hydraulically operated piston is relatively small.

An additional object of the invention is to provide a watch case heater that has two sets of four or more cooperating holding surfaces, each set being arranged to be independently brought into molding engagement for forming molded articles therein.

A further object of the invention is to provide a watch case mold with a separately contained pressure imposing mechanism that is adapted to directly apply distributed closing pressure to the mold parts along the inner edge portion of the annular mold members.

An additional object of the invention is to provide a multiple cavity heater of the watch case type wherein uniform temperatures may be obtained over the entire area of the article being formed in said mold.

These and other objects of the invention will be apparent from a consideration of the accompanying drawings wherein:

Figure 1 is a front elevational view of a mold constructed in accordance with the invention.

Fig. 2 is a side elevational view of the hinged side of the mold unit shown in Fig. 1.

Fig. 3 is a top plan view of the mold unit shown in Fig. 1 with the mold platens open for the insertion or removal of molded bodies therefrom.

Fig. 4 is a horizontal sectional view taken substantially on line 4—4 of Fig. 1, showing the internal construction of the mold unit in enlarged section.

Fig. 7 is a horizontal sectional view of a modified form of mold embodying the invention and adapted for use in forming hollow bodies.

Figure 6:
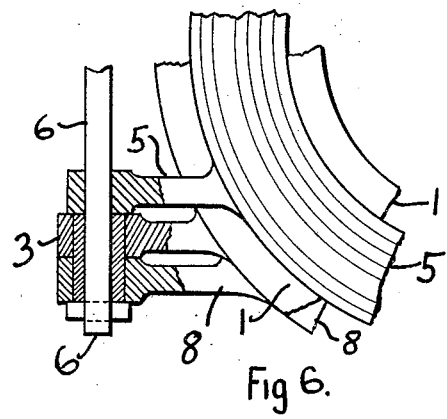
Fig. 6 is a detailed vertical sectional view, with parts broken away, of one of the hinge units of the mold, taken substantially on line 6—6 of Fig. 2.

The structure shown in Fig. 1 to Fig. 6, inclusive, comprises a steam jacketed mold body 1 that is supported from a suitable pedestal 2 and that has a pair of hinged supporting brackets 3 formed thereon. Each lateral face of the mold body 1 has a mold face that is provided with an annular groove for receiving mold rings 4 that respectively have a portion of a mold cavity formed therein.

A mold platen 5, that may either be steam jacketed or not, is carried on each hinge pintle 6 of the mold body and adapted to swing outwardly from the body of the mold. Each mold platen 5 has a molding face on each side that respectively cooperates with the mold rings 4 and 7 to provide mold cavities therebetween. A pair of steam jacketed platens 8 are respectively hinged on the pintles 6. The platens 8 also have annular grooves formed in one lateral face for receiving the mold ring 7 that is secured in place by suitable screws 9. It will therefore be seen that when the mold platens are closed, a plurality of independent annular mold cavities 10 are formed between the platen 5 and each of the mold rings.

In molds for handling relatively solid objects, such as bead rings for pneumatic vehicle tire casings, great pressure is required to properly size and form the bead elements. The direct application of hydraulic pressure to the mold platens is, so far as applicant is aware, the only method of obtaining sufficiently intense pressure for curing bead rings of the character specified.

In order to close the mold with sufficient degree of pressure to properly consolidate and mold articles of the proposed character in the mold cavities, a suitable hydraulic cylinder 12 that is mounted in the mold body 1 is used. A pair of opposed and separately actuated hydraulic pistons 13 and 14 are operatively mounted in the cylinder.

Figure 5:
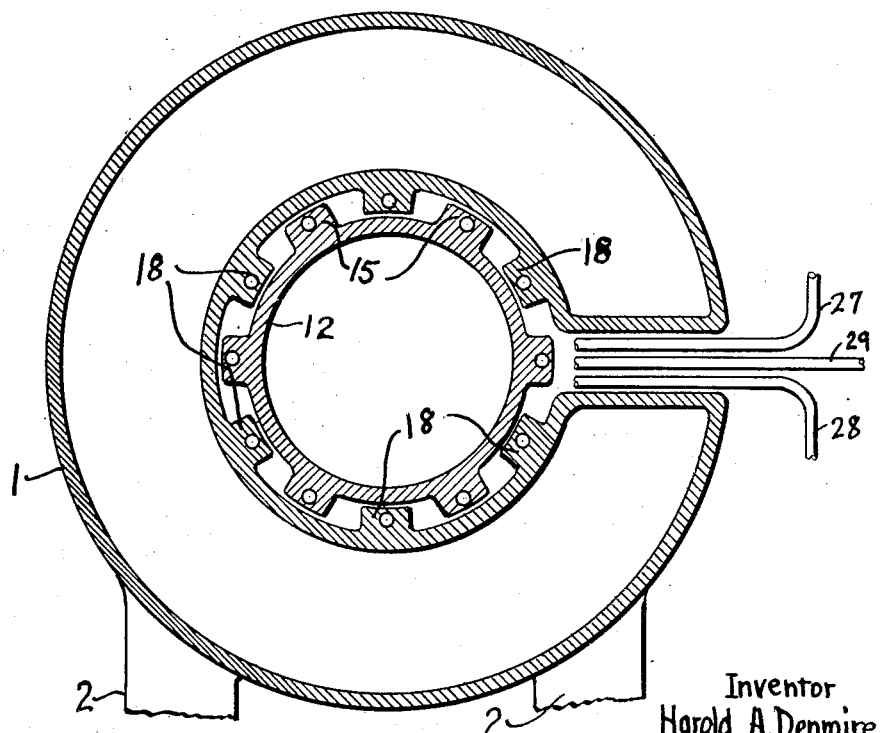
Fig. 5 is a vertical sectional view, with parts broken away, taken substantially on line 5—5 of Fig. 4 showing the method of supporting the hydraulic cylinder from the body of the mold.

The construction and mounting of the cylinder 12 is most clearly shown in Figs. 4 and 5 of the drawings. The cylinder sleeve has a series of uniformly spaced radially extending lugs 15 on each of its ends. Each lug is provided with a threaded aperture that is adapted to receive securing stud bolts 16 that serve to clamp the opposed cylinder heads 17 in position. The lugs at one end of the cylinder are staggered relative to the lugs at the other end, the size and spacing of the lugs at each end of the cylinder being the same.

The mold body 1 also has a series of uniformly spaced inwardly extending lugs 18 formed along each inner edge and positioned intermediate the lugs 15 with their outer faces in substantially the same plane as the plane of the outer faces of the lugs formed on the cylinder sleeve.

Each cylinder head 17 has a series of uniformly spaced apertures for receiving the securing stud bolts 16 that alternately engage the lug formed on the cylinder sleeve and the lug formed on the mold body to hold the cylinder sleeve in position within the mold body 1 and also to secure the cylinder head in position on the cylinder sleeve. An annular packing ring 19 is positioned in a groove formed in the coacting faces of the respective cylinder head members and the cylinder sleeve to insure a liquid tight joint between each cylinder head and the cylinder sleeve. Each cylinder head is also provided with an adjustable packing gland 20 that prevents leakage of the hydraulic liquid along the respective piston rods 21.

Each piston individually acts with one of the mold platens 8 to forcefully close one set of molding cavities on the material enclosed therein and to impose enormous pressure on the article being formed. The connection between the respective piston rods 21 and the mold platens 8 is provided by a disc 22 having a plurality of spaced radially arranged lugs 23 that extend outwardly from the disc and that are arranged to interlock with suitable inwardly extending lugs 24 that are carried by the platens 8 of the mold. The discs 22 are rotatably mounted on the piston rods and are adapted to transmit closing pressure from the piston rod to the disc through the enlarged head portions 25. A partial rotation of the discs 22 on their supporting piston rods, causes the lugs 23 and 24 to interlock as shown in Fig. 4 and Fig. 1. A suitable helical spring 26 is mounted between the opposed pistons to move the pistons to their extreme outermost positions after each operation to thereby facilitate the opening of the mold structure after its operation and to enable the operator to close the mold with very little effort. The pressure of the spring is only a small fractional part of the hydraulic pressure which opposes it in closing the mold.

The hydraulic pistons are actuated by suitable liquid pressure pipes 27 and 28 that extend through an aperture in the mold body and are adapted to supply liquid from a suitable valve control (not shown) to the respective pistons. The liquid (preferably water or oil) tends to draw the piston inwardly to thus close the mold with great pressure during the curing process. The cooperating jacketed platens 8 and the mold body 1 are supplied with steam at predetermined pressures for heating the material in the mold cavities to the proper curing temperature. The spacing of the hydraulic cylinder from the mold body 1 prevents objectionable heating of the hydraulic cylinder during operation.

A suitable drain 29 is formed in the hydraulic cylinder for removing any liquid that passes the piston rings 30 of the respective pistons to thereby eliminate back pressure on the rear side of the piston heads. The drain 29 can also be used to introduce air pressure behind the pistons to move them outwardly if it is desired to dispense with the use of the spring 26.

In operating the mold unit herein described, annular bodies to be molded, such for instance as prepared bead rings for use in pneumatic tires for which the illustrative mold unit is designed, are mounted in the molding cavities while the mold is in the position shown in Fig. 3. The mold is then closed by swinging the platens about the pintles 6 and turning the toothed locking disc to interlock the lugs 24 and 25 of the disc with the lugs of the mold platen. These lugs are interlocked by turning the discs to the position shown in Fig. 1 wherein the spaced lugs or teeth of the disc overlie the lugs that are carried on the outer mold platen. Hydraulic pressure is then supplied to the piston. The mold platens 8 are thereby forced against the body portion 1 of the device with sufficiently great pressure to consolidate and properly form the bodies that are carried in the molding cavities of the device.

It will be understood that the jacketed mold elements are charged with steam that maintains a suitable vulcanizing temperature for curing the bead rings to molded forms. Any other heating medium, such as an electric current, could also be used. After the lapse of sufficient time for properly curing the article being molded in the device, the hydraulic pressure is released through the valve controller and the pistons are forced to their outermost positions by the helical spring that is mounted therebetween. The toothed locking disc is then rotated to a position where the interlocking lugs disengage to permit opening of the mold.

Fig. 7 shows a modified form of mold incorporating the invention and intended for use in curing inner tubes for use in connection with pneumatic tire casings.

The mold body 35 has pairs of hinged mold platens 36 and 37 that are mounted on vertically arranged pintles 38. Each mold platen is provided with a mold shell 39 which mates with the opposing mold shell 40 of the adjacent mold part to provide a series of suitable mold cavities. The mold platens are held under molding pressure by the hydraulic cylinder 41 and the cooperating pistons 42.

The cylinder 41 is of the same general form as the previously proposed cylinder except that it is divided into two parts by the central partition 43. The cylinder 41 is held in place in the mold body 35 by the cylinder heads 44, each of which have a series of stud bolts 45 that respectively engage alternately arranged lugs 46 formed on the mold body 35 and lugs 47 formed on the respective ends of the cylinder. The cylinder is also spaced from the heated mold cavity by the lugs 46 and 47 to thereby prevent objectionable heating of the hydraulic cylinder from the jacketed mold units.

Each of the mold platens 37 have a series of inwardly extending lugs 48 that interlock with correspondingly arranged lugs 49 that are formed on the toothed discs 50. The discs 50 are each pivoted on the corresponding piston rod 51.

The pistons 42 have suitable packing rings 52 that are clamped in place by clamping rings 53 to prevent substantial leakage of liquid past the piston. A packing gland 54 is also provided for each piston rod.

Hydraulic pressure is applied to the pistons through supply pipes 55 that are independently controlled. Air supply pipes 56 serve respectively to supply air under pressure to the inner side of the pistons to move the pistons to their outermost positions for facilitating opening and closing of the mold. The air supply pipes 56 also serve as drains for liquid that passes the pistons when the hydraulic pressure is on.

This general form of multiple cavity mold can readily be used for molding and curing other articles such as tire casings, etc., with either a heated or an unheated intermediate mold platen. The mold shells 39 and 40 may also be changed to form molding cavities of different dimension.

It will be obvious from a consideration of the principles of the invention and the illustrative structures herein described that various modifications of the structure can be made without departing from the spirit of the invention. It is desired therefore that only such limitations shall be imposed thereon as are specifically set forth in the claims.

What I claim is:

1. A watch case heater comprising a heated mold body, a mold platen pivotally connected to one side thereof, a second heated mold platen disposed outside of the first platen and hinged to the mold body, a corresponding set of mold platens mounted on the other side of said mold body, a hydraulic cylinder mounted in the mold body, opposed pistons acting within said cylinder, means for releasably connecting one of the pistons to the outermost mold platen on one side, means for releasably connecting the other piston to the outermost mold platen on the other side, and means for independently controlling the operation of said pistons.

2. A watch case heater comprising a heated mold body, a mold platen pivotally connected to one side thereof, a second heated mold platen disposed outside of the first platen and hinged to the mold body, a corresponding set of mold platens mounted on the other side of said mold body, a hydraulic cylinder mounted in the mold body and having its side walls spaced therefrom, opposed pistons acting within said cylinder, means for releasably connecting one of the pistons to the outermost mold platen on one side, means for releasably connecting the other piston to the outermost mold platen on the other side, means for independently controlling the operation of said pistons, said cylinder having a series of outwardly extending spaced lugs formed at each end thereof, a corresponding series of inwardly extending lugs formed on said mold body, and means for connecting the cylinder heads alternately to the lugs of the mold body and the lugs of the cylinder to maintain the cylinder heads in position and also to maintain the cylinder in fixed relation relative to the mold body.

3. A mechanism comprising an annular body, a series of inwardly extending lugs formed on the body, a cylinder adapted to be mounted within the body with its side walls in spaced relation relative thereto having a series of outwardly extending lugs adapted to be disposed intermediate the lugs of the annular body, a cylinder head, and means for securing the cylinder head alternately to the lugs of the cylinder and to the lugs of the annular body to secure the cylinder in place within the annular body and to secure the cylinder head to the cylinder.

4. A watch case vulcanizer comprising a central, annular, mold supporting member, hinged, annular, mold carrying sections arranged to cooperate with the central member, and means for locking the hinged sections to the central member, said means comprising opposed, axially directed cylinders arranged in the central opening of the central member, apertured members arranged across the the central openings of the hinged members, pistons in the cylinders, piston rods extending from the pistons through the apertured members, locking members on the outer ends of the pistons rotatable thereon either to positions wherein they extend across the apertures in the apertured members for engagement therewith or to positions wherein they will permit the hinged members to be swung open and means for supplying fluid pressure to either side of the pistons.

5. A watch case vulcanizer comprising means for locking the hinged sections to the central member, said means comprising opposed, axially directed cylinders arranged in the central opening of the central member, apertured members arranged across the central openings of the hinged members, pistons in the cylinders, piston rods extending from the pistons through the apertured members, locking members on the outer ends of the pistons rotatable thereon either to positions wherein they extend across the apertures in the apertured members for engagement therewith or to positions wherein they will permit the hinged members to be swung open and means for supplying fluid pressure to either side of the pistons.

6. A vulcanizer comprising relatively movable annular sections, an apertured member secured to the inner peripheral portion of one section, a locking member adjustable so as, in effect, relatively to pass through the aperture as the sections are moved apart, said locking member being adjustable to span the aperture in said member, and fluid pressure means mounted in the central opening of the other section and connected to the locking member by a rod passing through the central opening of the first named section for drawing the locking member inwardly to clamp the vulcanizer section together.

7. A vulcanizer comprising a stationary annular section, a swinging annular section pivoted thereon, a pressure cylinder supported in the central opening of the stationary section, a piston in the cylinder, and a cross head connected to the piston by a rod passing through the central opening of the swinging section, the cross-head bearing upon the swinging section.

8. A vulcanizer comprising relatively movable, annular sections, a fluid pressure cylinder in the central opening of one section, a piston in said cylinder, and a rod passing through the central opening of the other section having a crosshead adapted to bear directly upon the other section.

9. A vulcanizer comprising a stationary annular section, a swingable annular section pivoted thereto, a cylinder supported within the central opening of the stationary section, a fluid pressure piston slidably mounted in said cylinder, a piston rod carried by said piston and extending through the central opening of said swingable section, a crosshead mounted on said piston rod to engage said swingable section, and resilient means axially urging said piston and rod toward said swingable section to facilitate engagement of said cross-head with said swingable section.

10. A watch case heater comprising a mold body, an inner mold platen carried by said mold body, an intermediate mold platen hinged to said mold body, an outer mold platen also hinged to said mold body, said intermediate platen cooperating with said inner platen to form at least one mold cavity, and cooperating with said outer platen to form at least one mold cavity, and a fluid pressure cylinder and piston mechanism mounted coaxially with respect to said mold cavities and connected to said outer platen interiorly with respect to the cavity of said outer platen for maintaining molding pressure between said mold platens.

11. A watch case heater vulcanizer comprising a central annular mold supporting body, mold carrying members hinged to opposite sides of said central body, and means for maintaining molding pressure between said members and body, said means comprising a cylinder within said central body, opposed reciprocable pistons mounted in said cylinder, cylinder heads secured to the open ends of said cylinder, piston rods carried by said piston and extending through said heads, releasably engageable means connecting said rods with said hinged members, and fluid pressure means for actuating said pistons toward each other to clamp said hinged members to said central member.

12. A watch case heater vulcanizer comprising a central annular mold supporting body, mold carrying members hinged to opposite sides of said central body, and means for maintaining molding pressure between said members and body, said means comprising a cylinder within said central body, opposed reciprocable pistons mounted in said cylinder, cylinder heads secured to the open ends of said cylinder, piston rods carried by said piston and extending through said heads, means for normally holding said pistons near said cylinder heads, releasably engageable means connecting said rods with said hinged members, and fluid pressure means for actuating said pistons toward each other to clamp said hinged members to said central member.

13. A watch case heater vulcanizer comprising a central annular mold supporting body, mold carrying members hinged to opposite sides of said central body, and means for maintaining molding pressure between said members and body, said means comprising a cylinder within said central body, opposed reciprocable pistons mounted in said cylinder, cylinder heads secured to the open ends of said cylinder, piston rods carried by said piston and extending through said heads, a compression spring member interposed between said pistons normally holding said pistons in their outermost positions, releasably engageable means connecting said rods with said hinged members, and fluid pressure means for actuating said pistons toward each other to clamp said hinged members to said central member.

14. A watch case vulcanizer comprising an annular body, a mold section carried thereby, one or more mold supporting members hinged to said body, mold sections carried by said members, a pressure cylinder within the central opening of said annular body, a cylinder head closing said cylinder, a reciprocable piston in said cylinder, a piston rod attached to said piston and extending through said cylinder head, means connecting said rod and the outermost hinged member, and fluid pressure means for moving said piston within said cylinder to hold said mold sections coaxial with each other in operative molding position.

In testimony whereof I affix my signature.

HAROLD A. DENMIRE.